United States Patent
Wang et al.

(10) Patent No.: US 9,815,914 B2
(45) Date of Patent: Nov. 14, 2017

(54) SOLID ELECTROLYTE AND LITHIUM BASED BATTERY USING THE SAME

(71) Applicants: Li Wang, Beijing (CN); Xiang-Ming He, Beijing (CN); Jian-Jun Li, Beijing (CN); Jian Gao, Beijing (CN); Chang-Yin Jiang, Beijing (CN)

(72) Inventors: Li Wang, Beijing (CN); Xiang-Ming He, Beijing (CN); Jian-Jun Li, Beijing (CN); Jian Gao, Beijing (CN); Chang-Yin Jiang, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 588 days.

(21) Appl. No.: 13/652,807

(22) Filed: Oct. 16, 2012

(65) Prior Publication Data
US 2013/0157146 A1  Jun. 20, 2013

(51) Int. Cl.
  *H01M 10/056* (2010.01)
  *C08F 2/48* (2006.01)
  *H01M 10/0565* (2010.01)
  *C08F 222/10* (2006.01)
  *C08F 220/28* (2006.01)
  *H01M 10/052* (2010.01)

(52) U.S. Cl.
  CPC .......... *C08F 2/48* (2013.01); *C08F 222/1006* (2013.01); *H01M 10/0565* (2013.01); *C08F 2220/286* (2013.01); *H01M 10/052* (2013.01); *H01M 2300/0082* (2013.01)

(58) Field of Classification Search
  CPC .............. H01M 2300/0082; H01M 2300/0091
  See application file for complete search history.

(56) References Cited

U.S. PATENT DOCUMENTS

| | | | | |
|---|---|---|---|---|
| 4,731,311 A | * | 3/1988 | Suzuki et al. | 429/213 |
| 5,609,974 A | * | 3/1997 | Sun | 429/317 |
| 6,833,220 B1 | * | 12/2004 | Yokoyama | H01M 6/16 429/309 |
| 2002/0188043 A1 | * | 12/2002 | Kim | C07D 333/56 524/95 |
| 2009/0104538 A1 | * | 4/2009 | Wakihara | H01M 10/0565 429/317 |
| 2010/0162892 A1 | | 7/2010 | Kase et al. | |
| 2010/0323247 A1 | * | 12/2010 | Takeshi | H01B 1/122 429/322 |

FOREIGN PATENT DOCUMENTS

CN   101754798   6/2010
JP   2001 155771  * 6/2001

OTHER PUBLICATIONS

Anette Munch Elmer, etal. "Solid electrolyte membranes from semi-interpenetrating polymer networks of PEG-grafted polymethacrylates and poly(methyl methacrylate)", Solid State Ionics. vol. 177, pp. 573-579, 2006.

* cited by examiner

*Primary Examiner* — Kuo-Liang Peng
(74) *Attorney, Agent, or Firm* — Steven Reiss (57) ABSTRACT

A solid electrolyte includes an interpenetrating polymer network and a lithium salt dispersed in the interpenetrating polymer network. The interpenetrating polymer network includes $-\!(\!CH_2\!-\!CH_2O\!)\!_n-$ segments, and is formed by polymerizing a first monomer $R_1\!-\!O\!-\!(\!CH_2\!-\!CH_2\!-\!O\!)\!_n\!-\!R_2$, a second monomer $R_3\!-\!O\!-\!(\!CH_2\!-\!CH_2\!-\!O\!)\!_m R_4$ and an initiator. Each "$R_1$", "$R_2$" and "$R_3$" includes —C═C— group or —C≡C— group. The "$R_4 \ldots$" includes an alkyl group or a hydrogen atom. The "m" and "n" are integer. Molecular weights of the first monomer and the second monomer are more than or equal to 100, and less than or equal to 800. The first monomer is less than or equal to 50% of the second monomer by weight. The lithium salt is less than or equal to 10% the second monomer by weight. A lithium based battery using the solid electrolyte is also provided.

16 Claims, 8 Drawing Sheets

SOLID ELECTROLYTE AND LITHIUM BASED BATTERY USING THE SAME

RELATED APPLICATIONS

This application claims all benefits accruing under 35 U.S.C. §119 from China Patent Application No. 201110423665.X, filed on Dec. 17, 2011 in the China Intellectual Property Office, the disclosure of which is incorporated herein by reference.

BACKGROUND

1. Technical Field

The present disclosure relates to solid electrolytes and lithium based batteries using the same and, in particular, to a solid polymer electrolyte (SPE) and a lithium based battery using the same.

2. Discussion of Related Art

The demand of high power and high energy density lithium based batteries has been with the rapid development of electric vehicles and portable electronic devices, such as mobile phones, digital cameras and notebook computers.

Electrolytes are important components in lithium based batteries. Solid electrolytes, especially solid polymer electrolytes, are non-volatile, non-explosive, flexible, and electrochemically stable. The polymers with $-(CH_2-CH_2-O)_n-$ segments are compatible with general lithium salts and can be used as solid electrolyte matrixes. However, the polymers with $-(CH_2-CH_2-O)_n-$ segments have high crystallization degrees, which make the solid electrolytes using the polymers be have low ion conductivities and bad thermal stabilities. Thus the lithium based batteries employing the solid electrolytes have short life spans.

What is needed, therefore, is to provide a solid polymer electrolyte including $-(CH_2-CH_2-O)_n-$ segments, and a lithium based battery using the same, to overcome the above-mentioned shortages.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

An SPE of one embodiment includes an IPN and a lithium salt. The lithium salt is dispersed in the IPN. The IPN includes $-(CH_2-CH_2-O)_n-$ segments, and is formed by polymerizing a first monomer $R_1-O-(CH_2-CH_2-O)_n-R_2$, a second monomer $R_3-O-(CH_2-CH_2-O)_m-R_4$ and an initiator. Wherein each "$R_1$", "$R_2$" and "$R_3$" includes an unsaturated group with $-C=C-$ group or $-C\equiv C-$ group. "$R_4$" is an alkyl group or a hydrogen (H). The alkyl group can be methyl ($-CH_3$), ethyl ($-CH_2-CH_3$), or propyl ($-CH_2-CH_2-CH_3$ or $-CH-(CH_3)_2$). "m" and "n" each represents an integer number.

The lithium salt is substantially used to conduct ions. The lithium salt is uniformly dispersed in the IPN, and mainly in solid solution. The lithium salt can be LiClO$_4$, lithium hexafluoro-phosphate (LiPF$_6$), lithium tetrafluoro-borate (LiBF$_4$), or lithium bis(oxalate)-borate (Li$_2$C$_2$O$_4$). The lithium salt also can be an anode active material or a cathode active material, such as lithium manganate (LiMn$_2$O$_4$), lithium iron phosphate (LiFePO$_4$), lithium nickelate (LiNiO$_2$), or lithium cobalt oxide (LiCoO$_2$). In the SPE, the lithium slat is less than or equal to 10% of the second monomer by weight.

The IPN is a matrix of the SPE, and mainly used to load the lithium salt. A molecular structure of the IPN can be in a linear and open-loop structure. In one embodiment, the molecular structure of the IPN is substantially a branch structure, like a tree. The "$R_1$ . . . " or "$R_2$ . . . " of the first monomer and "$R_3$ . . . " of the second monomer specifically can include unsaturated chain hydrocarbon groups or unsaturated chain hydrocarbon groups with carbonyl, such as, ethenyl ($-CH=CH_2$), ethynyl ($-C\equiv CH$), allyl ($-CH=CH-CH_3$, or $-(CH_3)C=CH_2$), propinyl ($-C\equiv C-CH_3$), or ethenyl ketonic group $$(-\overset{O}{\underset{\|}{C}}-HC=CH_2).$$

The "$R_1$", "$R_2$" and "$R_3$" in a same IPN can be the same groups or different groups.

Molecular weights of the first and second monomers can be respectively greater than or equal to 100, and less than or equal to 800. In one embodiment, the molecular weights of the first and second monomers can be respectively greater than or equal to 200, and less than or equal to 600. The first monomer is less than or equal to 50% of the second monomer by weight. In one embodiment, the first monomer is less than or equal to 20% of the second monomer by weight.

The initiator is to make the first and second monomers form free radicals and polymerize into the IPN. The initiator can be a thermo-initiator or a photo-initiator. The thermo-initiator can be chloride gas, bromine gas, organic peroxide, or azo initiator. The photo-initiator can be 1-hydroxy-cyclohexyl phenyl ketone (HCPK), 2-methyl-1-[4-(methylthio)-phenyl]-2-morpholino-propiopheno (MMMP), or dimethylol propionic acid (DMPA).

The IPN can be made by the following steps:

S10, providing the first monomer, the second monomer and the initiator;

S20, mixing the first monomer, the second monomer and the initiator to form a mixture, wherein the weight ratio of the first monomer and the second monomer is less than or equal to 50%; and S30, polymerizing the first monomer with the second monomer to form the IPN.

In step S10, the initiator is selected by the pre-polymerizing groups of the first and second monomers. The initiator can vary from the first and second monomers.

Step S20 can include: firstly, mixing the first and second monomers; next, adding the initiator to form the mixture; and then agitating the mixture. The added content of the initiator is less than 1% of the second monomer by weight.

If the initiator is the photo-initiator, step S30 can include the sub-steps of: putting the mixture into a protective gas; using UV light to irritate the mixture to substantially polymerize the first monomer, the second monomer and the photo-initiator to form the IPN; and heating the IPN to obtain a dried IPN. The protective gas can be an inert gas, such as nitrogen gas, helium gas, neon gas, argon gas, krypton gas or xenon gas. An irritating time of UV light is in a range from about 30 minutes to about 2 hours. In one embodiment, the irritating time ranges from about 45 minutes to about 1.5 hours. The irritating time can be determined by the amounts and types of the first and second monomers. A wave length of the UV light can be about 365 nanometers. The IPN is heated to a first temperature for a first heating time, to remove the solvent used in the process of forming the IPN, and the first temperature ranges from about 50 centigrade degrees to about 100 centigrade degrees. In one embodiment, the first temperature is in a range from about 60 centigrade degrees to about 90 centigrade degrees. The first heating time ranges from about 5 hours to about 24 hours. In one embodiment, the first heating time is in a range from about 7 hours to about 12 hours.

When the initiator is the thermo-initiator, the step S30 is mainly made by a thermal polymerization method. The method can include the following sub-steps of: putting the mixture into the protective gas; and heating the mixture to a second temperature for a second heating time, to make the first monomer, the second monomer, and the thermo-initiator to form the IPN substantially polymerize. Wherein, the second temperature in the thermo-polymerizing process can be less than 80 centigrade degrees. In one embodiment, the second temperature is greater than 40 centigrade degrees, and less than 70 centigrade degrees. The second heating time ranges from about 5 hours to about 24 hours. In one embodiment, the second heating time is in a range from about 1 hour to about 12 hours, such as 2 hours, 8 hours. The second temperature and the second heating time can be determined by the amounts and types of the first and second monomers.

In one embodiment, the first monomer is polyethyleneglycol dimethacrylate (PEGdiA), and the second monomer is methoxy polyethylene glycol monoacrylate (PEGmA). That is to say, the IPN is mainly formed by polymerizing PEGdiA and PEGmA. Specifically, a method for making the IPN can include the following steps: providing PEGdiA, PEGmA, and the initiator; mixing PEGdiA, PEGmA, and the initiator to form a mixture, and PEGdiA is less than 50% of PEGmA by weight; and then putting the mixture into the protective gas, and irritating the mixture by UV light or heating the mixture to make the PEGdiA, PEGmA, and the initiator substantially polymerize, thereby forming the IPN.

A method for making the SPE is similar to the method for making the IPN, except that the lithium salt is added in the IPN making process. Specifically, the lithium salt is provided in the step S10, and the step S20 further includes mixing the lithium slat with other the first monomer, the second monomer, and the initiator.

One embodiment of a lithium battery using the SPE is also provided. The lithium battery includes an anode, a cathode, the SPE, and an encapsulated structure. The anode, the cathode and the SPE are sealed in the encapsulated structure. The anode, the SPE and the cathode is respectively in sheet shaped. The anode, the SPE and the cathode are overlapped in order.

In one embodiment, the lithium based battery can be a lithium ion battery. A thickness of the anode can range from about 100 micrometers to about 300 micrometers. In one embodiment, the thickness of the anode is about 200 micrometers. A thickness of the cathode can range from about 50 micrometers to about 200 micrometers. In one embodiment, the thickness of the cathode is about 100 micrometers. The anode includes a sheet-shaped anode collector and an anode material layer located and/or formed on the anode collector. The cathode includes a sheet-shaped cathode collector, and a cathode material layer located and/or formed on the cathode collector.

Both the cathode material layer and the anode material layer are attached to the SPE. The anode collector and the cathode collector can be metals. Specifically, the anode collector can be aluminum foil, or titanium foil. The cathode collector can be copper foil or nickel foil. A thickness of the anode collector and a thickness of the cathode collector can respectively range from about 1 micrometer to about 200 micrometers. The anode material layer includes uniformly mixed an anode active material, with a conductive additive, and an adhesive additive. The cathode material layer includes a cathode active material, the conductive additive and the adhesive additive uniformly mixed with each other. The anode active material can be $LiMn_2O_4$, $LiFePO_4$, $LiNiO_2$, or $LiCoO_2$. The cathode active material can be natural graphite, cracking organic carbon, or mesocarbon microbeads (MCMB). The conductive additive can be graphite, acetylene black, carbon nanotube, or any combination thereof. The adhesive additive can be poly(vinylidene fluoride) (PVDF), poly(tetrafluoroethylene) (PTFE), styrene-butadiene rubber (SBR) or any combination thereof. It is noted that the anode active material, the cathode material, the conductive additive, and the adhesive additive, can be other conventional materials used in the lithium based batteries.

EXAMPLE

Figure 1:
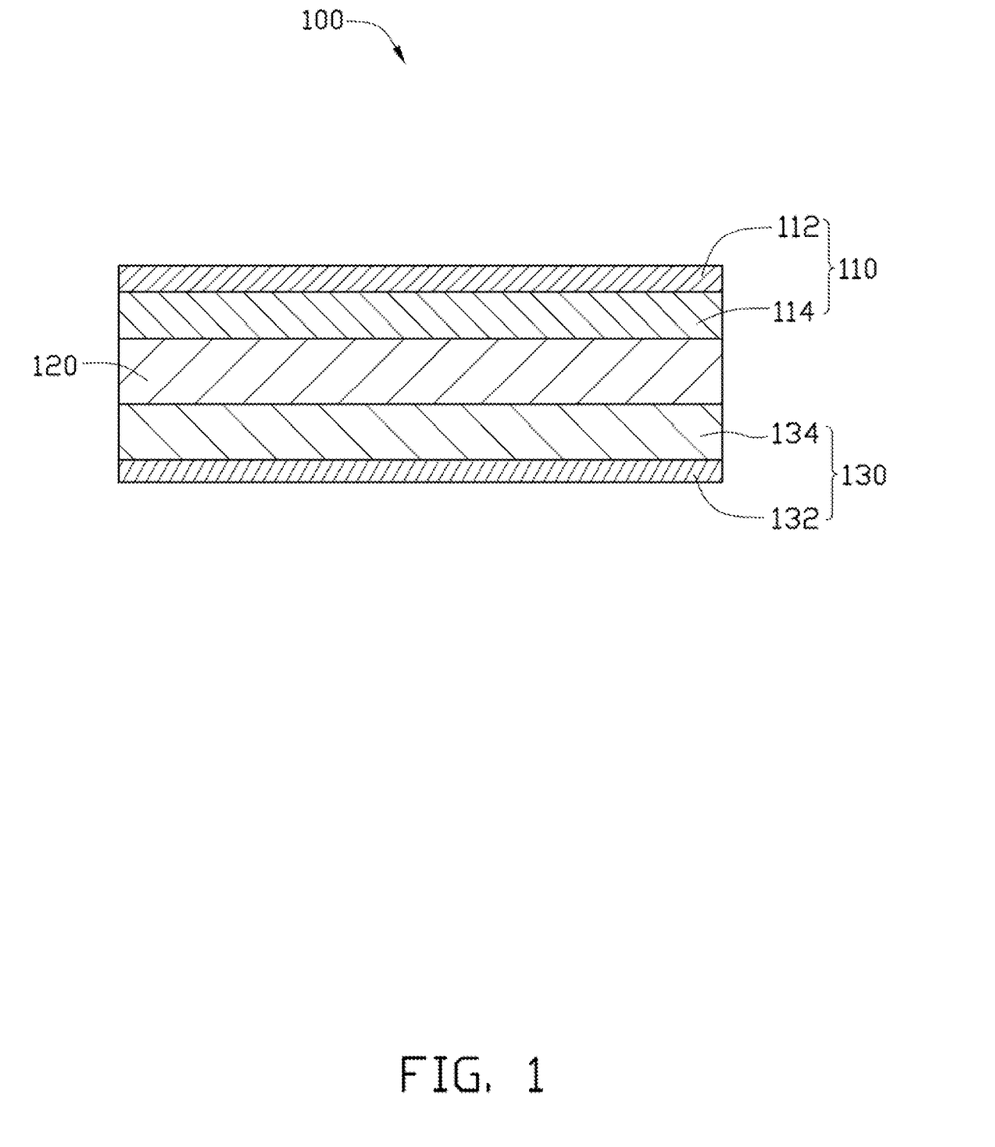
FIG. 1 is a schematic view of a lithium based battery of one embodiment.

Referring to FIG. 1, one embodiment of the lithium based battery 100 is provided. The lithium based battery 100 is a lithium ion battery, includes an anode 110, an IPN-$LiClO_4$ SPE 120 and a cathode 130. The anode 110 includes an aluminum foil anode collector 112 and an anode material layer 114 located on the aluminum foil anode collector 112. The anode material layer 114 consists of LiFePO$_4$, natural graphite, and PVDF. The cathode 130 includes a copper foil cathode collector 132 and a cathode material layer 134 located on the copper foil cathode collector 132. The cathode material layer 134 consists of MCMB, graphite and PVDF. The IPN-LiClO$_4$ SPE 120 is composed of IPN and LiClO$_4$ dispersed in the IPN matrix. The IPN is formed by PEG350 Ma, PEG200diA and DMPA by UV—in situ polymerization process. The polymerization reaction equation is as follow:

Wherein all of the subscripts a, b, c, x, y, z, o, p, and q are integers.

Specifically, the IPN-LiClO$_4$ SPE 120 can be made by the following steps:

mixing PEG200diA with PEG350mA according to PEG200diA being less than or equal to 50% of PEG350mA by weight, and then adding DMPA and LiClO$_4$ to form a mixture, wherein DMPA is about 0.1% of PEG350mA by weight, and LiClO$_4$ is less than or equal to 10% of PEG350mA by weight;

putting the mixture onto a PTFE plate in nitrogen gas; and using UV light with a wavelength about 365 nanometers irritate the mixture for about 60 minutes to make PEG350mA with PEG200diA substantially polymerize to form the IPN; and heating for about 8 hours at a temperature about 80 centigrade degrees to dry the IPN, DMPA and LiClO$_4$, thereby obtaining the IPN.

Wherein, contents of the raw materials for making the IPN-LiClO$_4$ SPE 120 affect properties of the IPN-LiClO$_4$ SPE 120. Details are shown as follow:

(1) Thermal Property of the IPN Matrix

Figure 2:
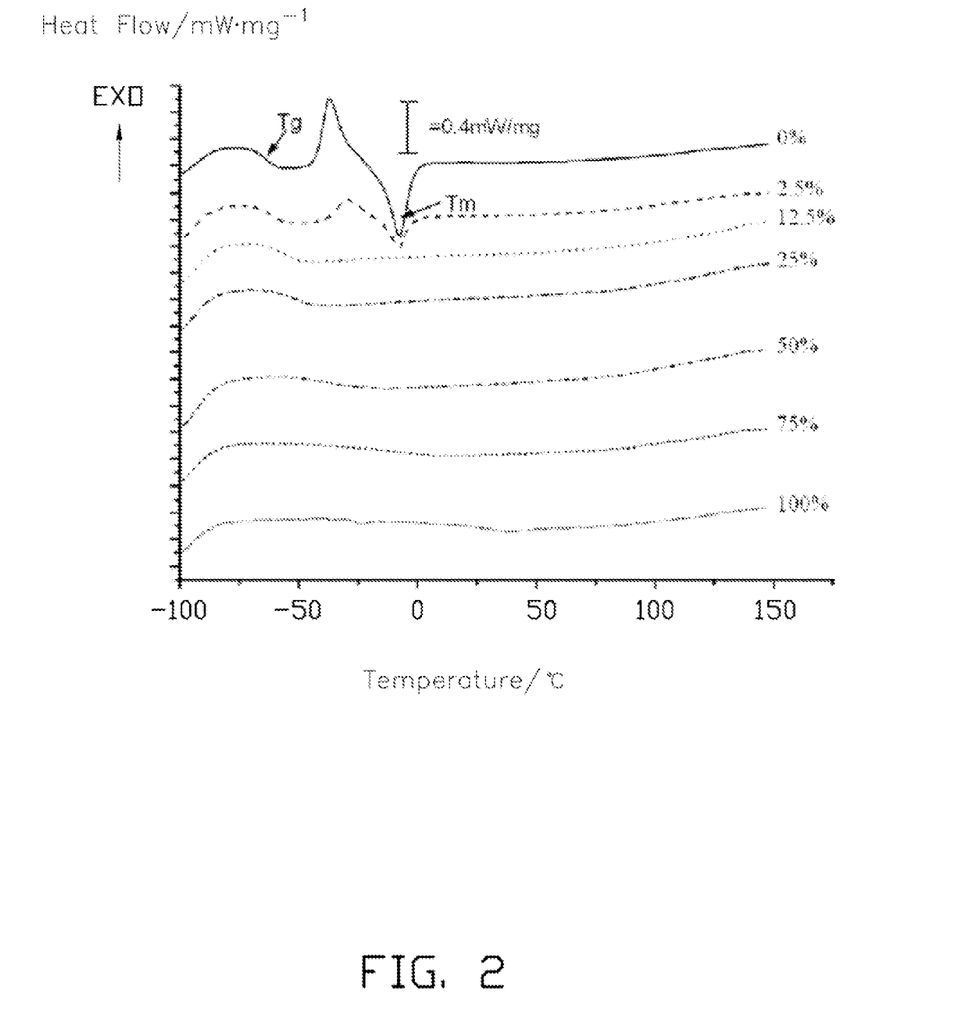
FIG. 2 shows differential scanning calorimetry (DEC) curves of an interpenetrating polymer network (IPN) with different weight ratios of polyethyleneglycol (200) dimethacrylate (PEG200diA) and methoxy polyethylene glycol (350) monoacrylate (PEG350mA), wherein "200" in PEG200diA represents a molecular weight of the PEG group is about 200, and "350" in PEG350mA represents a molecular weight of the PEG group is about 350.

Transferences of Li$^+$ mainly occur in amorphous phase of the IPN matrix. A glass transition temperature ($T_g$) is a characteristic feature of the amorphous phase of the IPN matrix. $T_g$ can be measured by DSC. A crystalline melting temperature ($T_m$) can reflect crystalline structure of the IPN matrix. $T_m$ can also be measured by the DSC. Referring to FIG. 2 and table 1 shown as below, the weight ratio of PEG350mA and PEG200diA is important for the thermal property of the IPN matrix. Wherein, in the table 1, "PEG200diA content by weight" represents for PEG200diA is about a certain percent of PEG350mA by weight.

TABLE 1

| PEG200diA content by weight | $T_g$ (centigrade degrees) | $T_m$ (centigrade degrees) | $\Delta H_m$ (J/K) |
|---|---|---|---|
| 0 | −63.7 | −7.5 | −22.25 |
| 2.5% | −61.1 | −8.0 | −10.69 |
| 12.5% | −57.1 | — | — |
| 25% | −52.8 | — | — |

Wherein $\Delta H_m$ stands for an enthalpy change from PEG350mA and PEG200diA to the IPN, and is related to the ether group.

$T_g$ of the IPN matrix increases with increasing of the PEG200diA content, and the $T_g$ peak is weaker and weaker. When the PEG200diA content is higher than 50%, the $T_g$ peak will disappear. The DSC curves trend towards linear shapes. These may be resulted from the increasing of the PEG200diA content. Crosslinking degrees of the IPN matrix are higher and higher as the PEG200diA content increases, which decreases mobility of sub-chains in the IPN matrix. The decrease of the mobility of sub-chains in the IPN matrix will greatly hinder Li$^+$ migration. Therefore, PEG200diA should be lower than 50% of PEG350mA by weight in the IPN matrix.

In addition, the thermal stability of the IPN matrix is better than single thermal stability of PEG350mA and PEG200diA. The $T_g$ of the IPN matrixes are lower than −45 centigrade degrees. Therefore, the IPN matrix is applicable thermal stability. The IPN matrix is suitable to be used as the SPE matrix.

(2) FT-IR of the IPN-LiClO$_4$ SPE

Figure 3:
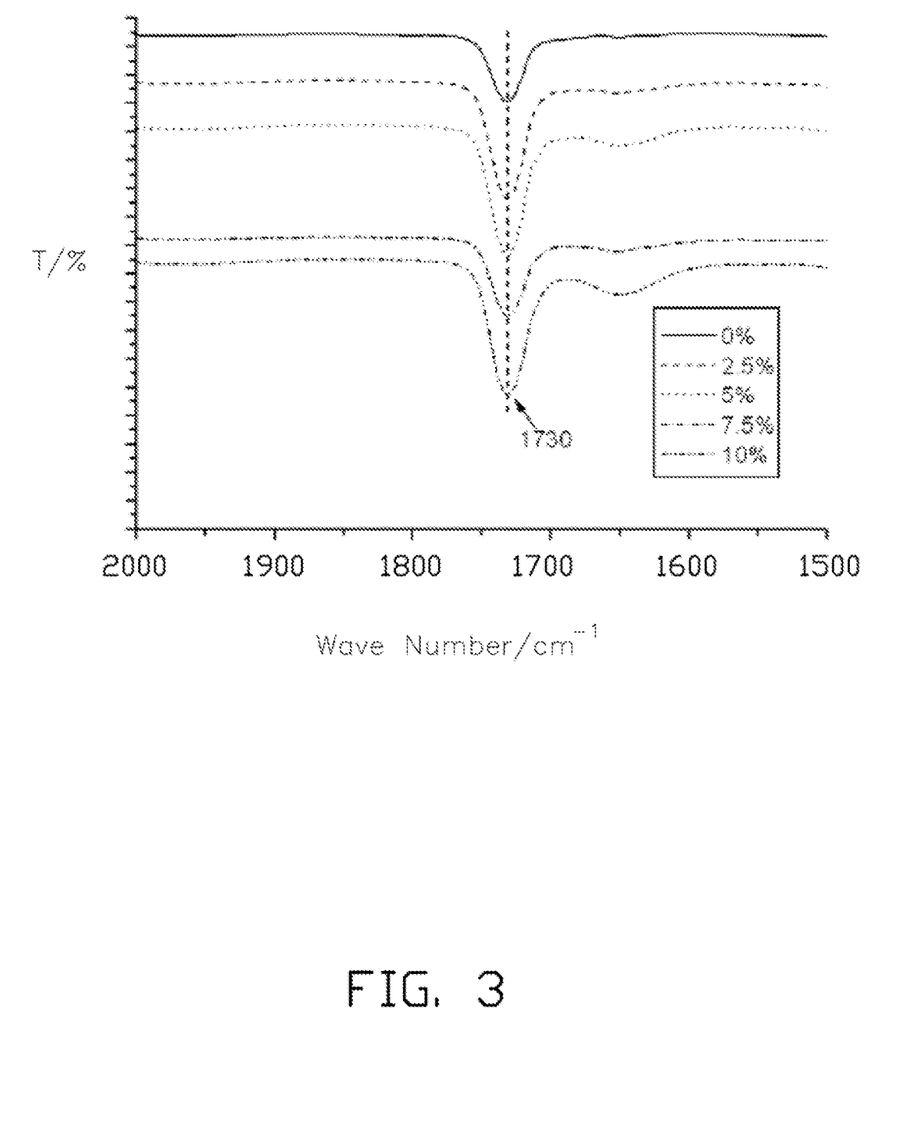
FIG. 3 shows a Fourier transform infrared spectroscopy (FTIR) of IPN-lithium perchlorate (IPN-LiClO$_4$) SPEs, wherein lithium perchlorate (LiClO$_4$) has different weight percents of PEG350mA.
Figure 4:
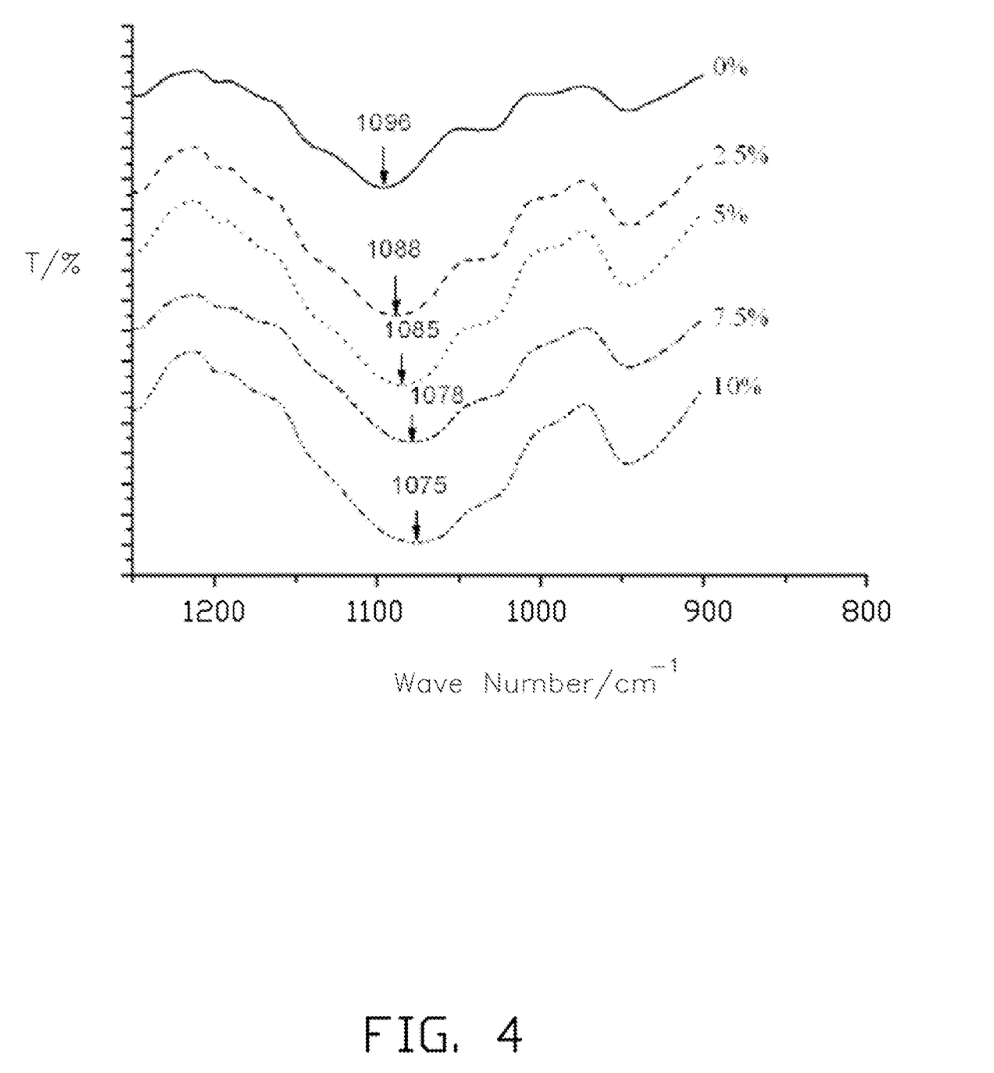
FIG. 4 shows an FTIR of stretching vibration of ether groups in the IPN-LiClO$_4$ SPEs, wherein LiClO$_4$ has different weight percents of PEG350mA.
Figure 5:
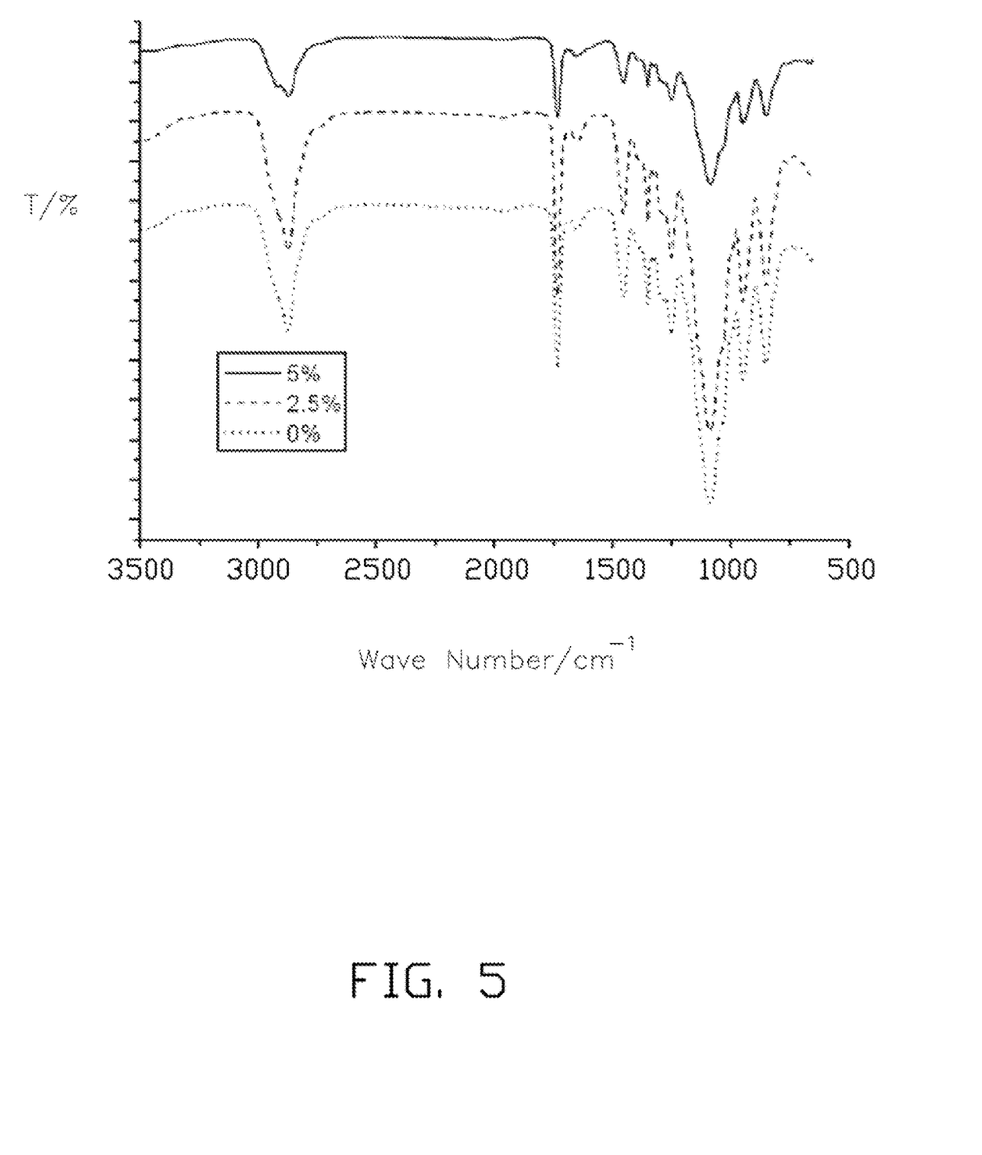
FIG. 5 shows an FTIR of the IPN-LiClO$_4$ SPEs, wherein PEG200diA has different weight percents of PEG350mA.

Referring to FIGS. 3 and 4, the ether group (C—O—C) is electron donors, and Li$^+$ tends to coordinate with O atoms. When LiClO$_4$ is about 5% by weight of PEG350mA, shapes positions, and relative intensities of the characteristic peaks in the FT-IR of the IPN-LiClO$_4$ shown in FIG. 5 are similar. These shows the weight ratios of the PEG200diA and PEG350mA have little effects or even no effects on the shapes, positions, and relative intensities of the characteristic peaks in the FT-IR. It also indicates that Li$^+$ tends to combine with C—O—C in the IPN matrix.

(3) Ionic Conductivity of the IPN-LiClO$_4$ SPE

Figure 6:
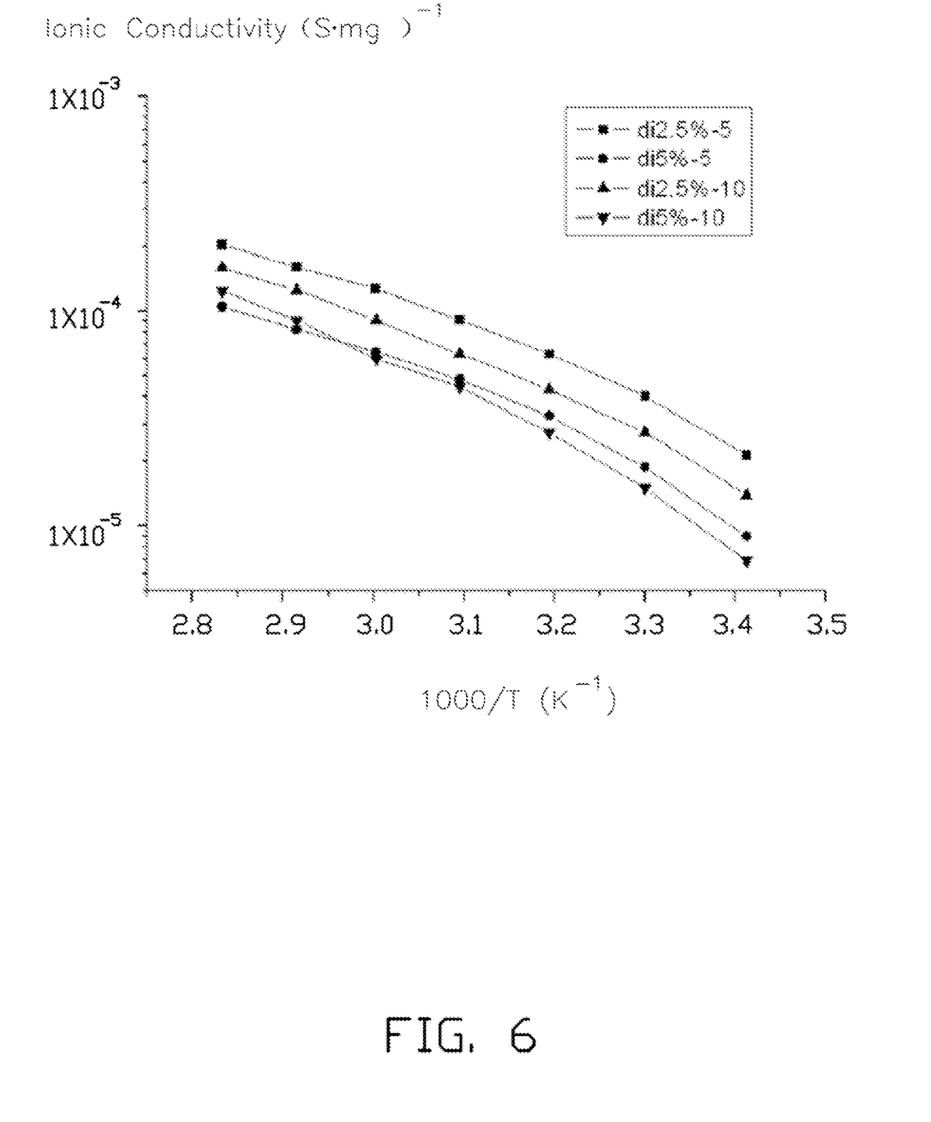
FIG. 6 shows ion conductivity curves of IPN-LiClO$_4$ SPEs, wherein PEG200diA has different weight percents of PEG350mA.
Figure 7:
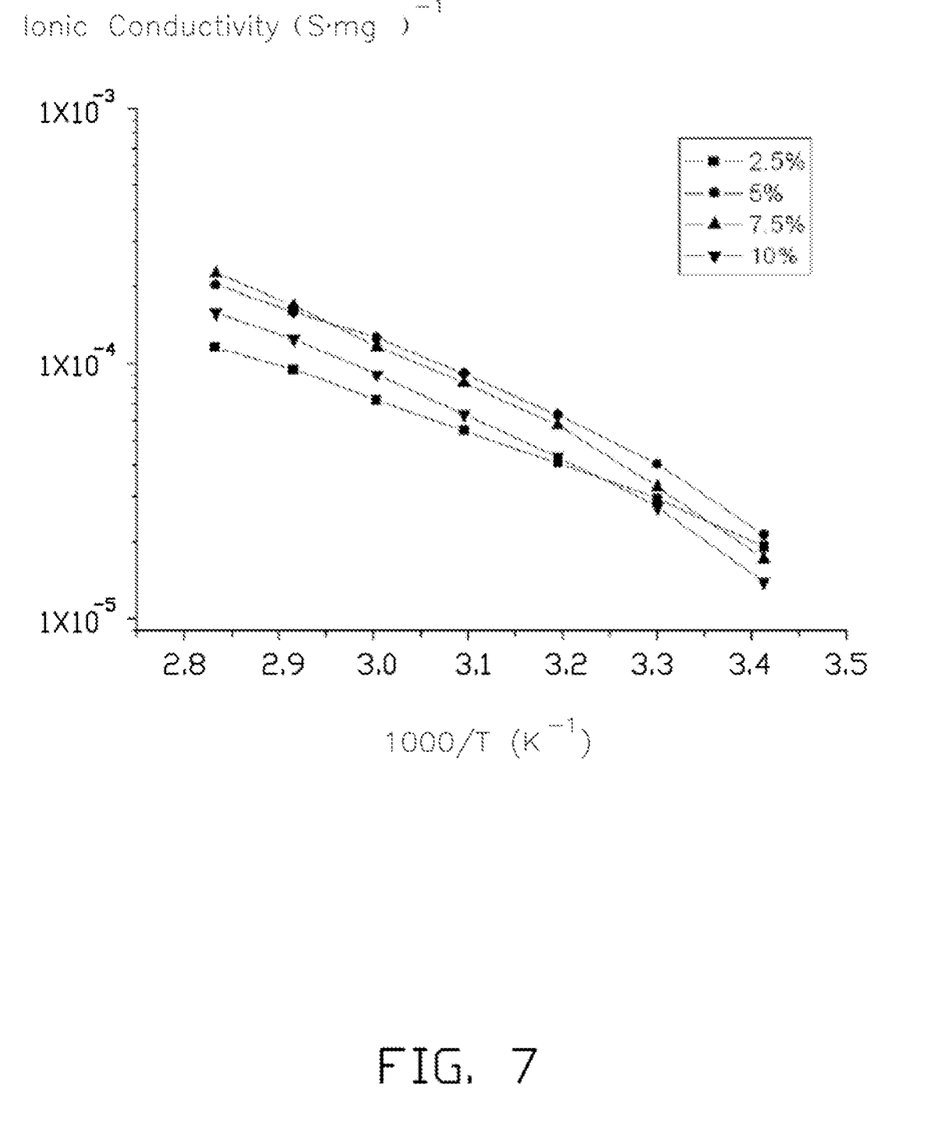
FIG. 7 shows ion conductivity curves of IPN-LiClO$_4$ SPEs, wherein LiClO$_4$ has different weight percents of PEG350mA.

Referring to FIGS. 6 and 7, "T" in the "1000/T" stands for a real Kelvin temperature of the IPNs-LiClO$_4$ SPE, thus "1000/T" is a ratio of 1000 Kelvin (K) and the real Kelvin temperature. In FIG. 6, "di2.5%-5" stands for PEG200diA is about 2.5% of PEG350mA by weight, and LiClO$_4$ is about 5% of PEG350mA by weight; "di5%-5" stands for PEG200diA is about 5% of PEG350mA by weight, and LiClO$_4$ is about 5% of PEG350mA by weight; "di2.5%-10" stands for PEG200diA is about 2.5% of PEG350mA by weight, and LiClO$_4$ is about 10% of PEG350mA by weight; and "di5%-10" stands for PEG200diA is about 5% of PEG350mA by weight, and LiClO$_4$ is about 10% of PEG350mA by weight.

The ionic conductivities of the IPN-LiClO$_4$ SPEs decrease as the increasing of "1000/T". Thus, the ionic conductivities of the IPN-LiClO$_4$ SPEs decrease as the decreasing of the real temperature of the IPN-LiClO$_4$ SPEs. When LiClO$_4$ content is kept unchanged, PEG200diA content is lower, the ionic conductivities of the IPN-LiClO$_4$ SPEs are higher. The reason can be that PEG200diA can speed the cross linking of the IPN matrix, improve the cross linking degrees and crystallization degrees of the IPN matrix, and PEG200diA also can decrease the mobility of branched chains of the IPN matrix. Thus the ionic conductivities of the IPN-LiClO$_4$ SPEs are low. Wherein, when PEG200diA is about 5% of PEG350mA by weight, and LiClO$_4$ is about 5% of PEG350mA by weight, the ionic conductivities of the IPN-LiClO$_4$ SPEs are relatively high, such as shown in FIG. 6.

In FIG. 7, when the real temperature is in a range from about 20 centigrade degrees to about 60 centigrade degrees, PEG200diA is about 5% of PEG350mA by weight, the ionic conductivities of the IPN-LiClO$_4$ SPEs are highest. When the real temperature is greater than 60 centigrade degrees, PEG200diA is about 2.5% of PEG350mA by weight, LiClO$_4$ is about 7.5% of PEG350mA by weight, and the ionic conductivities of the IPN-LiClO$_4$ SPEs are highest of all. These may be caused that LiClO$_4$ is easy to dissolve in a high temperature. FIG. 7 also shows the IPN-LiClO$_4$ SPE also can have a high ionic conductivity, even if LiClO$_4$ is in a low content in the IPN-LiClO$_4$ SPE.

(4) Thermal Stability of the IPN-LiClO$_4$ SPE

Figure 8:
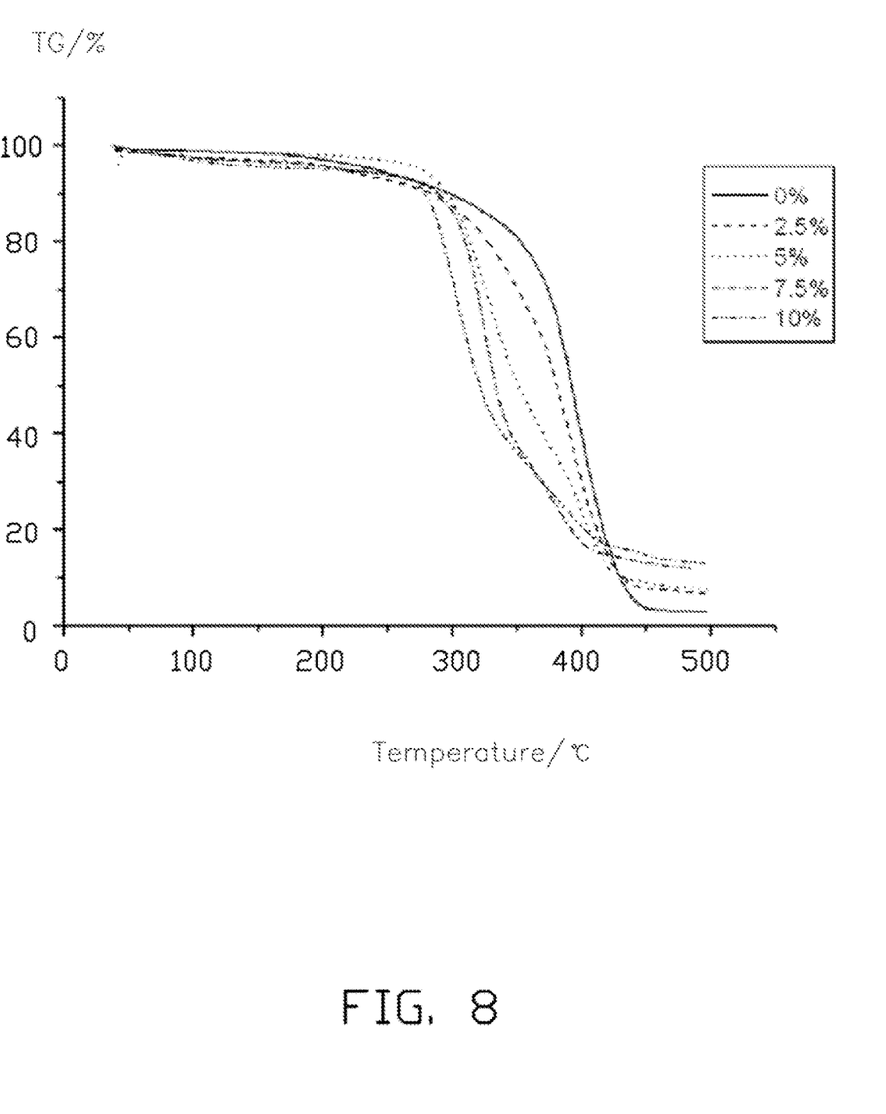
FIG. 8 shows thermo-gravimetric (TG) curves of IPN-LiClO$_4$ SPEs, wherein LiClO$_4$ has different weight percents of PEG350mA.

Referring to FIG. 8, when LiClO$_4$ reaches to about 10% of PEG350mA by weight, the IPN-LiClO$_4$ SPE has excellent thermal stability under about 270 centigrade degrees. Wherein, "TG %" in FIG. 8 stands for a weight of the IPN-LiClO$_4$ SPE at a working temperature is a certain percent of the weight of the IPN-LiClO$_4$ SPE at room temperature.

The SPE and the lithium battery using the same have the following advantages:

The IPN matrix has a low crystallization degree such that the ionic conductivity of the SPE is high. The IPN matrix includes $-(CH_2-CH_2-O-)_n$ segments, the O atoms in the $-(CH_2-CH_2-O-)_n$ segments combines with Li$^+$. Therefore, the IPN-LiClO$_4$ SPE also can have a high ionic conductivity, even if LiClO$_4$ is in a low content, or the IPN-LiClO$_4$ SPE is used at room temperature. In addition, branched chains of the IPN matrix have low degrees of crystallization, which cause the IPN matrix has a high $T_g$. And the IPN matrix is good in thermal stability and electrochemical stability. Therefore, the IPN-LiClO$_4$ SPE using the IPN matrix also has good thermal stability and electrochemical stability. Because the IPN-LiClO$_4$ SPE is excellent in high ionic conductivity, thermal stability and electrochemical stability, the lithium battery using the IPN-LiClO$_4$ SPE has long span, high power, good stability and safety.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A solid electrolyte, consisting of:
an interpenetrating polymer network comprising $-(CH_2-CH_2-O-)_n$ segments, the interpenetrating polymer network formed by polymerizing only two monomers consisting of a first monomer $R_1-O-(CH_2-CH_2-O-)_n R_2$ and a second monomer $R_3-O-(CH_2-CH_2-O-)_m R_4$, and an initiator, wherein the first monomer is polyethyleneglycol (200) dimethacrylate, "200" represents a molecular weight of the polyethyleneglycol (200) dimethacrylate; and the second monomer is methoxy polyethylene glycol (350) monoacrylate, "350" represents a molecular weight of the methoxy polyethylene glycol (350) monoacrylate; and
a lithium salt dispersed in the interpenetrating polymer network,
wherein each "$R_1$", "$R_2$" and "$R_3$" comprises —C=C— group or —C≡C— group; the "$R_4$" comprises an alkyl group or a hydrogen atom; the "m" and "n" are integers; molecular weights of the first monomer or the second monomer are more than or equal to 100 and less than or equal to 800; the first monomer is less than or equal to 50% of the second monomer by weight; the lithium salt is less than or equal to 10% of the second monomer by weight; and the solid electrolyte is a plasticizer-free solid electrolyte.

2. The solid electrolyte of claim 1, wherein a molecular structure of the interpenetrating polymer network comprises an open circle structure.

3. The solid electrolyte of claim 1, wherein each "$R_1$", "$R_2$" and "$R_3$" comprises unsaturated chain hydrocarbon groups or unsaturated chain hydrocarbon groups with carbonyl.

4. The solid electrolyte of claim 3, wherein each "R1", "R2" and "R3" comprises ethenyl (—CH=CH2), ethynyl (—C≡CH), allyl (—CH=CH—CH3, or —(CH3)C=CH2), propinyl (—C≡C—CH3), or ethenyl ketonic group $(-\overset{O}{\underset{\|}{C}}-HC=CH_2)$.

5. The solid electrolyte of claim 1, wherein the lithium salt is selected from a group consisting of lithium perchlorate, lithium hexafluoro-phosphate, lithium tetrafluoro-borate, lithium bis(oxalate)-borate, lithium manganate, lithium iron phosphate, lithium nickelate, lithium cobalt oxide, and combinations thereof.

6. The solid electrolyte of claim 1, wherein the initiator is a photo-initiator selected from a group consisting of 1-hydroxy-cyclohexyl phenyl ketone, 2-methyl-1-[4-(methylthio)-phenyl]-2-morpholino-propiopheno, and dimethylol propionic acid.

7. The solid electrolyte of claim 1, wherein the initiator is a thermo-initiator selected from a group consisting of chloride gas, bromine gas, organic peroxide, and azo initiator.

8. The solid electrolyte of claim 1, wherein the lithium salt is lithium perchlorate.

9. The solid electrolyte of claim 8, wherein the initiator is dimethylol propionic acid.

10. The solid electrolyte of claim 9, wherein the polyethyleneglycol (200) dimethacrylate is about 2.5% by weight of the methoxy polyethylene glycol (350) monoacrylate.

11. The solid electrolyte of claim 10, wherein the lithium perchlorate is about 5% of the methoxy polyethylene glycol (350) monoacrylate by weight.

12. The solid electrolyte of claim 11, wherein the dimethylol propionic acid is about 0.1% by weight of the methoxy polyethylene glycol (350) monoacrylate.

13. A lithium based battery, comprising:
an anode,
a cathode; and
a solid electrolyte attached between the anode and the cathode, and the solid electrolyte consisting of:
an interpenetrating polymer network comprising $-(CH_2-CH_2-O)_n$ segments, and the interpenetrating polymer network formed by polymerizing only two monomers consisting of a first monomer $R_1-O-(CH_2-CH_2-O)_n R_2$ and a second monomer $R_3-O-(CH_2-CH_2-O)_m R_4$, and an initiator, wherein the first monomer is polyethyleneglycol (200) dimethacrylate, "200" represents a molecular weight of the polyethyleneglycol (200) dimethacrylate; and the second monomer is methoxy polyethylene glycol (350) monoacrylate, "350" represents a molecular weight of the methoxy polyethylene glycol (350) monoacrylate; and
a lithium salt dispersed in the interpenetrating polymer network, and the lithium salt is $LiClO_4$;
wherein, each "$R_1$", "$R_2$" and "$R_3$" comprises $-C=C-$ group or $-C\equiv C-$ group; the "$R_4$" comprises an alkyl group or a hydrogen atom; the "m" and "n" are integers; the first monomer is about 2.5% of the second monomer by weight, $LiClO_4$ is about 7.5% of the second monomer by weight, and the solid electrolyte is a plasticizer-free solid electrolyte.

14. The lithium based battery of claim 13, wherein each "$R_1$", "$R_2$" and "$R_3$" comprises ethenyl, ethynyl, allyl, propinyl, or ethenyl ketonic group.

15. A solid electrolyte, comprising:
an interpenetrating polymer network comprising $-(CH_2-CH_2-O)_n$ segments, the interpenetrating polymer network formed by polymerizing only two monomers consisting of a first monomer $R_1-O-(CH_2-CH_2-O)_n R_2$, and a second monomer $R_3-O-(CH_2-CH_2-O)_m R_4$, and an initiator; wherein the first monomer is polyethyleneglycol (200) dimethacrylate, "200" represents a molecular weight of the polyethyleneglycol (200) dimethacrylate; and the second monomer is methoxy polyethylene glycol (350) monoacrylate, "350" represents a molecular weight of the methoxy polyethylene glycol (350) monoacrylate; and
a lithium salt dispersed in the interpenetrating polymer network and being in solid solution;
wherein each "$R_1$", "$R_2$" and "$R_3$" comprises $-C=C-$ group or $-C\equiv C-$ group; the "$R_4$" comprises an alkyl group or a hydrogen atom; the "m" and "n" are integers; the first monomer is less than or equal to 50% of the second monomer by weight; and the lithium salt is less than or equal to 10% of the second monomer by weight.

16. The solid electrolyte of claim 15, wherein the first monomer is about 5% of the second monomer by weight.

* * * * *

UNITED STATES PATENT AND TRADEMARK OFFICE
CERTIFICATE OF CORRECTION

| | | |
|---|---|---|
| PATENT NO. | : 9,815,914 B2 | Page 1 of 1 |
| APPLICATION NO. | : 13/652807 | |
| DATED | : November 14, 2017 | |
| INVENTOR(S) | : Li Wang et al. | |

It is certified that error appears in the above-identified patent and that said Letters Patent is hereby corrected as shown below:

On the Title Page

Please add Item (30) regarding "Foreign Application Priority Data" with the following:

(30) Foreign Application Priority Data
Dec. 17, 2011 (CN) ................... 2011 1 0423665X Signed and Sealed this
Nineteenth Day of June, 2018

Andrei Iancu
*Director of the United States Patent and Trademark Office*